United States Patent [19]

Gliemeroth et al.

[11] Patent Number: 4,486,541
[45] Date of Patent: Dec. 4, 1984

[54] PHOTOTROPIC GLASS WITH A REFRACTIVE INDEX OF AT LEAST 1.59

[75] Inventors: George Gliemeroth, Mainz-Finthen; Uwe Eichhorn, Mainz-Mombach, both of Fed. Rep. of Germany

[73] Assignee: Schott Glaswerke, Mainz, Fed. Rep. of Germany

[21] Appl. No.: 559,018

[22] Filed: Dec. 8, 1983

Related U.S. Application Data

[63] Continuation of Ser. No. 372,752, Apr. 28, 1982, abandoned.

[30] Foreign Application Priority Data

Apr. 29, 1981 [DE] Fed. Rep. of Germany ....... 3117000

[51] Int. Cl.³ .................... C03C 3/26; C03C 3/08; C03C 3/10
[52] U.S. Cl. ................................................. 501/13
[58] Field of Search ....................................... 501/13

[56] References Cited

U.S. PATENT DOCUMENTS 3,630,765 12/1974 Araujo ............................. 501/13
3,923,529 12/1975 Araujo et al. .................... 501/13
4,018,965 4/1977 Kerko et al. ..................... 501/13
4,149,896 4/1979 Faulstich et al. ................ 501/13
4,190,451 2/1980 Hares et al. ..................... 501/13
4,251,278 2/1981 Hares ............................. 501/13

FOREIGN PATENT DOCUMENTS 2107343 10/1971 Fed. Rep. of Germany ....... 501/13
2404752 8/1975 Fed. Rep. of Germany .

Primary Examiner—Mark Bell
Attorney, Agent, or Firm—Haight & Associates

[57] ABSTRACT

A phototropic glass with an optical position $n_d \leq 1.59$ and $v_d \geq 40$ and with a density of $\leq 3.2$ g/cm³ is described for the first time. Its composition lies within the system of

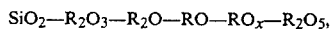

$$SiO_2 - R_2O_3 - R_2O - RO - RO_x - R_2O_5,$$

wherein $R_2O_3$ is $Al_2O_3$, $B_2O_3$ and rare earth oxides; $R_2O$ is alkali metal oxides; RO is alkaline earth metal oxides, ZnO, SnO, or PbO; $RO_x$ is $GeO_2$, $ZrO_2$, $TiO_2$, or $WO_3$; and $R_2O_5$ is $Nb_2O_5$, $Ta_2O_5$, or $P_2O_5$.

8 Claims, No Drawings

PHOTOTROPIC GLASS WITH A REFRACTIVE INDEX OF AT LEAST 1.59

This is a continuation of application Ser. No. 372,752, filed Apr. 28, 1982, now abandoned.

DESCRIPTION OF THE INVENTION

This invention relates to a phototropic glass containing silver halide which may be used as glass for eyeglasses and which, in contrast to customary phototropic glasses for eyeglasses, is characterized by special cosmetic suitability for all dioptic ranges for plus and minus glasses (through the rim and/or center thickness).

TECHNICAL FIELD OF THE INVENTION

This invention relates to a phototropic, light-weight, highly refractive glass for eyeglasses with low dispersion. Phototropic glasses are currently used predominantly as glass for eyeglasses and have increasingly been used as corrective glasses for defective vision. For correcting any defective vision by means of glass with a refrative index of 1.523, the eyeglasses become increasingly voluminous for the higher dioptic ranges (more severe defective vision); this means greater weight for the eyeglasses. Therefore, highly refractive and simultaneously relatively light-weight eyeglasses have been sought. While some such glasses have been found, so far attempts at manufacturing such eyeglasses with phototropic qualities have failed. The reason for this difficulty lies in the composition of the highly refractive, light-weight eyeglasses which makes it impossible to achieve the precipitation, of silver-halide containing regions in the glass by means of appropriate tempering conditions. This phase separation is absolutely necessary for phototropic glasses based on silver halides.

If one, for instance, melts the familiar, highly refractive, light-weight glasses of German Pat. No. 2,259,183 with carriers of phototropy, one obtains a white, opaque mass which cannot be used as eyeglass.

The state of the art in the area of highly refractive, light-weight glasses is well represented by German Pat. No. 2,259,183; in the area of phototropic glasses by German Pat. No. (DPS) 2,404,752 and DPS 2,223,629.

Highly refractive, phototropic glasses are also known but are not of interest for purposes of the present invention due to their high weight.

In the review of the customary silver-halide containing phototropic glasses, to the extent they had properties deviating from the standard refractive index for eyeglass of $n_d = 1.523$, it was found that it appears to be impossible to manufacture an $SiO_2$-containing phototropic glass with a refractive index $\geq 1.59$, an Abbe index $\geq 50$, and a density $\geq 3.2$ g/cm$^3$. Although German Published Patent Application DOS 2,140,915 describes glasses with a relatively high refractive index, these glasses must contain no $SiO_2$ because otherwise the product becomes opaque.

If one transfers this result to the glasses of DPS 2,259,183 one recognizes the great difficulty of manufacturing more highly refractive, light weight $SiO_2$ glasses with phototropic qualities: both the more highly refractice, light-weight glasses provided with silver and halide components, and also the phototropic, more highly refractive glasses provided with $SiO_2$ for stabilization purposes become from milky to opaque.

The glasses in DOS 2,140,915, moreover, have density values of above 3.2 g/cm$^3$. The review of glasses in accordance with DOS 2,256,775 resulted only in glasses with refractive indices of less than 1.59, that of the glasses in accordance with German DOS 2,260,879 only in glasses with densities of above 3.2 g/cm$^3$.

All the above cited, familiar phototropic glasses do not permit a combination of the criteria of phototropy, low density, low dispersion and high refractive index.

The Abbe index

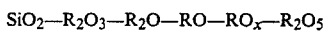

$$V_d = (n_{d-1})/(n_F - n_c)$$

is of importance in so far as it results in color seams at values of <40 when being looked through at an oblique angle, due to excessive dispersion, i.e. excessive wave length dependency of the refractive index. This type of color seam must be avoided in eyeglasses.

Also of importance is the feasibility of manufacturing under current commercial conditions. Certain raw materials, such as tantalum oxide, for example, today have such high prices that their use for eyeglasses has become possible only in a very limited manner although their effect on networking, i.e. for devitrification stability which is of great importance in the production process, is of the greatest interest.

Additionally, an $SiO_2$ content of at least 10 percent by weight is of absolute necessity for such eyeglasses for reasons of mass production via cuvettes and automatic presses due to viscosity and crystallization criteria.

The general object of the invention is glasses with phototropic qualities due to a content of silver, halides and copper (or other equivalent sensitizers corresponding to copper) which possess a refractive index $n_d \geq 1.59$, an Abbe index $\geq 40$, and a density $\leq 3.2$ g/cm$^3$.

It has been found that the objects of this invention can generally be achieved in glass systems which are composed of at least two networking agents, e.g. $SiO_2$ or $GeO_2$ and $B_2O_3$, or of three networking agents, e.g., $SiO_2$, $B_2O_3$ and $P_2O_5$, or $GeO_2$, $B_2O_3$ and $P_2O_5$.

Specifically, the object is achieved with glasses which with at least 80 mole percent are in the glass system $$SiO_2-R_2O_3-R_2O-RO-RO_x-R_2O_5$$

wherein $R_2O_3$ is at least one of $Al_2O_3$, a rare earth oxide, $Nd_2O_3$, or $B_2O_3$;

$R_2O$ is at least one alkali metal oxide;

RO is at least one alkaline earth metal oxide, ZnO, SnO, or PbO;

$RO_x$ is $GeO_2$, $ZrO_2$, $TiO_2$, or $WO_3$; and $R_2O_5$ is $Nb_2O_5$, $Ta_2O_5$, or $P_2O_5$, and which contain silver, halides and sensitizers, e.g. copper, as ionic compounds and as carriers of phototropy.

It has now been found that phototropic glasses which contain as carrier of phototropy precipitations which consists of silver, halides and other components, can be produced with a refractive index $\geq 1.59$, an Abbe index $\geq 40$, and a density $\geq 3.2$ g/cm$^3$ if one selects a glass composition, expressed in percent by weight on an oxide basis, which contains the following components:

(a)
$SiO_2$: 10–60, preferably >10, especially 32–47
$B_2O_3$: 14.5–42, especially 14.5–27.0
$P_2O_5$: 0–40, especially 0–11 wherein the sum of $SiO_2$, $B_2O_3$ and $P_2O_5$ is 51.0–76.0, preferably 56.0–71.0 and especially 58.0–71.0 percent and at least one component from the $SiO_2$, $B_2O_3$ and $P_2O_5$ group may be substituted, in whole or in part, in a molar manner by germanium oxide;

(b)

$Al_2O_3$: 0–15, especially 0–0.4
$ZrO_2$: 1–12, preferably 1.5–10
$La_2O_3$: 0–23, preferably 0–10
$Nb_2O_5$: 0–12, preferably 0–10, especially 0–2
$Ta_2O_5$: 0–18
$WO_3$: 0–7, preferably 0–1 wherein the sum of $Al_2O_3$, $ZrO_2$, $La_2O_3$, $Nb_2O_5$, $Ta_2O_5$ and $WO_3$ is 5.0–30.0, preferably 2–25 and especially 7–25 percent;

(c)

MgO: 0–5, preferably 0–1
CaO: 0–8, preferably 2–8, especially 0–6
SrO: 0–24
BaO: 0–4, preferably 0 wherein the sum of the alkaline earth metal oxides is 0–24.0, preferably 2–24;

(d)

ZnO: 0–6
$SnO_2$: 0–3
PbO: 0–16, preferably 0.5–12
$TiO_2$: 0–14, preferably 0.5–8, especially 3.5–8, wherein ZnO+SnO+PbO+$TiO_2$ is 2.0–24.0 percent and the sum of PbO and $TiO_2$ is 1.0–20.0 percent, preferably 2–20 and especially 4–16; and the sum of $La_2O_3$, SrO, PbO, $TiO_2$, $Nb_2O_5$, $ZrO_2$, $WO_3$ and $Ta_2O_5$ is 12–34;

$Li_2O$: 0–8 preferably 0.5–6
$Na_2O$: 0–12, generally 0–8, preferably 0–4
$K_2O$: 0–16, generally 0.5–12, preferably 6–12 wherein the sum of the alkali metal oxides is 6.5–15, preferably 7–14;

(f) wherein the glass additionally contains at least 0.05 percent by weight of $Ag_2O$, between 0 and 0.1 percent by weight of copper oxide or another phototropic sensitizer, and at least 0.25 percent by weight of halogens; and (g) Remainder: less than 10 percent by weight.

A content of $P_2O_5$ in a concentration between 0.01 and 11 percent by weight is favorable for the chemical stability of the phototropic glass.

The networking agents of the basic glass, i.e., the components $SiO_2$, $B_2O_3$ and $P_2O_5$ and/or $GeO_2$, are present in a concentration from 51 to 76 percent by weight. All glasses according to the present invention should, however, contain a minimum of 10 percent by weight of $SiO_2$ for use in mass production.

Instead of $La_2O_3$, other rare earth oxides or mixtures of $La_2O_3$ and other rare earth oxides can be used.

To create a brown tinting in an exposed condition the glass can be endowed with precious metals by known techniques.

To create color hues in an unexposed condition, the glass can be mixed with a total of 1 percent by weight of subsidiary-group metal oxides and/or a total of 5 percent by weight (additional) of tinting rare earth metal oxides.

The concentration of the carrier of phototropy, in addition to the basic glass composition, should at least be 0.1 percent by weight for $Ag_2O$, at least 0.1 percent by weight for bromine, at least 0.1 percent by weight for chlorine, and at least 0.004 percent by weight for copper oxide.

If the silver-halide containing, phototropic glasses of the invention are exposed to irradiation by actinic light, photolysis becomes effective in these silver-halide containing precipitations. The silver developed in the course of this grows into silver colloids and creates an absoprtion in the visible range of the spectrum. If the phototropic glass is no longer excited by an appropriate irradiation, the system returns to its original condition.

In order to manufacture the phototropic glasses of the invention and to adjust their phototropic properties it is necessary not only to introduce silver and halogens and sensitizers, such as copper oxide, for example, into the glass but also to preferably temper the glasses. Tempering as used herein is defined to mean the heating of the glasses to 500° to 720° C. for a period of from 10 minutes to 26 hours. The quality of the product obtained after tempering is influenced by the concentrations selected.

If the concentration of silver is too low with the halogen content being adequate, the glass tends to become turbid during tempering. As the silver content increases, the turbidity decreases while an increased darkening is observed in the excited condition. However, if the silver concentration selected is too high, even an untempered glass tends to become turbid. Moreover, it has been determined that the silver concentration influences the kinetics of the phototropic process. When the silver content is too low, the kinetics are poor; as the concentration of silver increases, the kinetics improve until it deteriorates once more when the content is too high. The optimum silver concentration for each individual glass composition can be determined by a principle series of investigations; it should however, not go below 0.1 percent by weight in the analysis.

The halogens used customarily are bromine and chlorine, but even if only one of these two halogens is used, phototropic properties are mevertheless found in the glasses of the invention. It is technologically somewhat complicated to adjust the suitable halogen concentrations since the vapor pressures of these components are very high at the melting temperature. Suitable halogen concentrations and the ratio of halogens between each other have to be determined on a series of tests for each selected composition of the glasses of the invention; the concentrations of bromine and chloride, however, should each not fall below 0.1 percent by weight.

The effect of the halogen concentration on the phototropic qualities is similar to that of silver. Any quantities of chlorine and bromine that are too low cause turbidity in the tempered glass; phototropy is only very weak. As the halogen concentration increases, the phototropic properties become stronger; kinetics are improved and darkening under excited conditions decreases. If the halogen content selected is too high, turbidity appears even in the untempered glass.

When CuO is introduced into a copper-free phototropic glass the kinetics of the phototropic process improve with increasing copper oxide contents; additionally, it has been noticed that the darkening capacity of the glass becomes lower and the temperature dependency greater.

The adjustment of the copper concentration in the phototropic glass, is one of the determinants for the kinetics and the depth of blackening achievable; moreover, it influences the temperature dependency of the phototropic process. If a content of CuO below 0.004 percent by weight is selected, the kinetics appear to be too poor for ophthalmic uses of the glasses.

The eyeglass of the invention possesses a refractive index $\geq 1.59$, an Abbe index $\geq 40$, and a density $\leq 3.2$ g/cm$^3$, good chemical stability, and can be ground and polished into optical eyeglasses without difficulty.

All of the examples of the invention can be prepared with other concentrations than those given for silver, halogen and copper in such a way that the phototropic properties are varied.

All glasses of the invention can be mixed with tinting metal compounds, such as NiO, CuO, etc. in order to obtain constant tinting.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLES 1–16

Table 1 shows examples of glasses of the invention, in percent by weight; in the synthesis, 0.27 percent by weight of Ag$_2$O, 0.64 percent by weight of Cl; 1.21 percent by weight of Br and 0.006 percent by weight of CuO were added to all the glasses.

The symbols used in Table 1 mean the following: $n_d$ is the refractive index, D is the density in g./cm$^3$, the Abbe index has been defined as $V_d$, RHL is the regeneration half life in min. after a standard exposure of 15 min. with 80,000 lx of xenon light, during which the saturation transmission ST in percent (measured at 545 nm) was achieved. R30 is the transmission value, in percent, which the glass achieves after 30 min. of regeneration. All phototropic data were determined at 20° C. on samples with a thickness of 2 mm.

EXAMPLE 17

An especially good glass of the present invention has the following composition, in percent by weight:

| | |
|---|---|
| SiO$_2$ | 39.10 |
| B$_2$O$_3$ | 18.00 |
| P$_2$O$_5$ | 0.25 |
| Al$_2$O$_3$ | 0.10 |
| ZrO$_2$ | 5.50 |
| La$_2$O$_3$ | 10.50 |
| Nb$_2$O$_5$ | 0.50 |
| WO$_3$ | 1.00 |
| CaO | 0.10 |
| SrO | 1.00 |
| PbO | 5.55 |
| TiO$_2$ | 5.70 |
| Li$_2$O | 2.20 |
| Na$_2$O | 2.20 |
| K$_2$O | 9.00 |
| Ag$_2$O | 0.20 |
| CuO | 0.016 |
| Cl | 0.25 |
| Br | 0.36 |

This glass with good phototropic properties has a refractive index of 1.613, an Abbe index of 47 and a density of 2.96 g/cm$^3$.

EXAMPLE 18

A further, especially suitable composition is, in percent by weight:

| | |
|---|---|
| SiO$_2$ | 39.10 |
| B$_2$O$_3$ | 18.00 |
| P$_2$O$_5$ | 0.25 |
| Al$_2$O$_3$ | 0.10 |
| ZrO$_2$ | 5.50 |
| La$_2$O$_3$ | 0.50 |
| WO$_3$ | 1.00 |
| CaO | 0.10 |
| SrO | 1.00 |
| PbO | 15.55 |
| TiO$_2$ | 5.70 |
| Li$_2$O | 2.20 |
| Na$_2$O | 2.20 |
| K$_2$O | 9.00 |
| Ag$_2$O | 0.27 |
| CuO | 0.009 |
| Cl | 0.64 |
| Br | 1.21 |

TABLE 1

| Number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SiO$_2$ | 42.48 | 40.00 | 37.05 | 35.00 | 40.00 | 39.10 | 39.10 | 39.10 | 39.10 | 39.10 | 35.00 | 34.00 | 44.10 | 44.10 | 41.10 | 38.10 |
| B$_2$O$_3$ | 18.15 | 18.15 | 20.00 | 26.00 | 18.00 | 18.00 | 18.00 | 18.00 | 18.00 | 18.00 | 26.00 | 25.00 | 20.00 | 20.00 | 18.00 | 18.00 |
| P$_2$O$_5$ | — | — | 0.25 | 1.55 | — | 0.25 | 0.25 | 0.25 | 0.25 | 0.25 | 0.50 | 0.25 | 0.25 | 0.25 | 0.25 | 0.25 |
| Al$_2$O$_3$ | — | — | 0.10 | — | — | 0.10 | 0.10 | 0.10 | 0.10 | 0.10 | — | 0.10 | 0.10 | 0.10 | 0.10 | 0.10 |
| ZrO$_2$ | 8.24 | 9.72 | 5.50 | 2.00 | 6.00 | 5.50 | 5.50 | 5.50 | 5.50 | 5.50 | 2.00 | 4.00 | 5.50 | 5.50 | 4.00 | 3.00 |
| La$_2$O$_3$ | 10.99 | 12.99 | 4.00 | 1.50 | 0.50 | 0.50 | 10.50 | 15.50 | 5.50 | 5.50 | 1.50 | 1.00 | — | 5.50 | 5.50 | 5.50 |
| Nb$_2$O$_5$ | — | — | 0.20 | 0.50 | 8.50 | 0.50 | 0.50 | 0.50 | 10.50 | 0.50 | 0.50 | 0.20 | 0.20 | 0.20 | 8.50 | 8.50 |
| WO$_3$ | — | — | 0.50 | 1.00 | 1.00 | 1.00 | 1.00 | 1.00 | 1.00 | 11.00 | 1.00 | 0.50 | 0.50 | 0.50 | 1.00 | 1.00 |
| MgO | — | — | 0.20 | 1.00 | — | — | — | — | — | — | — | 0.20 | 0.20 | 0.20 | — | — |
| CaO | — | — | 5.00 | 5.50 | 2.50 | 0.10 | 0.10 | 0.10 | 0.10 | 0.10 | 4.50 | 6.00 | 7.50 | 0.50 | 0.10 | 0.10 |
| SrO | — | — | 1.00 | 2.50 | 2.50 | 1.00 | 1.00 | 1.00 | 1.00 | 1.00 | 2.50 | 1.00 | 1.00 | 8.00 | 1.00 | 1.00 |
| PbO | 8.50 | 7.50 | 8.50 | 8.95 | 5.50 | — | 15.55 | 5.55 | 0.55 | 0.55 | 10.50 | 10.55 | 1.55 | 1.55 | 3.55 | 8.55 |
| TiO$_2$ | 2.10 | 2.10 | 2.70 | 2.50 | 3.50 | 5.70 | 5.70 | 5.70 | 5.70 | 5.70 | 3.50 | 3.00 | 5.70 | 5.70 | 3.70 | 2.70 |
| Li$_2$O | 3.80 | 3.80 | 2.20 | 2.00 | 3.00 | 2.20 | 2.20 | 2.20 | 2.20 | 2.20 | 2.00 | 3.00 | 2.20 | 2.20 | 2.20 | 2.20 |
| Na$_2$O | — | — | 2.20 | — | — | 2.20 | 2.20 | 2.20 | 2.20 | 2.20 | — | 0.20 | 2.20 | 2.20 | 1.20 | 1.20 |
| K$_2$O | 5.73 | 5.73 | 10.00 | 10.00 | 9.00 | 10.00 | 9.00 | 9.00 | 9.00 | 9.00 | 10.00 | 10.00 | 9.00 | 9.00 | 10.00 | 10.00 |
| | 100.01 | 99.99 | 99.40 | 100.00 | 100.00 | 100.01 | 100.65 | 100.70 | 100.70 | 100.10 | 99.50 | 99.60 | 100.00 | 100.20 | 100.20 | 100.20 |
| nd | 1.593 | 1.604 | 1.608 | 1.593 | 1.597 | 1.620 | 1.614 | 1.623 | 1.615 | 1.617 | 1.6040 | 1.609 | 1.591 | 1.609 | 1.594 | 1.600 |
| V$_d$ | 40 | 40 | 59 | 58 | 42 | 51 | 46 | 44 | 46 | 45 | 62 | 60 | 49 | 48 | 41 | 41 |
| D(g/cm$^3$) | 2.92 | 2.99 | 3.00 | 2.85 | 2.94 | 2.93 | 2.96 | 2.98 | 2.99 | 3.05 | 2.87 | 2.90 | 2.67 | 2.74 | 2.92 | 2.98 |
| ST percent | 35 | 24 | 27 | 32 | 21 | 26 | 30 | 23 | 27 | 31 | 27 | 36 | 29 | 30 | 25 | 27 |
| RHL (min) | 2.0 | 3.2 | 3.0 | 2.4 | 4.0 | 3.3 | 2.8 | 3.4 | 4.0 | 2.3 | 3.2 | 3.0 | 3.6 | 3.5 | 4.0 | 2.9 |
| R 30 percent | 82 | 77 | 80 | 75 | 85 | 79 | 80 | 80 | 79 | 80 | 78 | 78 | 83 | 75 | 78 | 80 |

Having good phototropic properties (ST-26 percent; RHWZ-2.9 min.), this glass has a refractive index of 1.620, an Abbe index of 51 and a density of 2.93 g/cm$^3$.

EXAMPLE 19

The following example illustrates the manufacture of a glass in accordance with the invention:

| Mixture Ratio | |
| --- | --- |
| 662.4 g | ground quartz sand |
| 531.5 g | boric acid |
| 3.8 g | phosphorus pentoxide |
| 1.9 g | aluminum monohydrate |
| 82.8 g | zirconium oxide |
| 3.0 g | niobium pentoxide |
| 7.5 g | tungsten oxide |
| 7.6 g | magnesium carbonate |
| 201.6 g | calcium carbonate |
| 22.3 g | strontium carbonate |
| 53.6 g | red lead oxide |
| 85.9 g | titanium oxide |
| 82.5 g | lithium carbonate |
| 56.7 g | sodium carbonate |
| 135.0 g | potassium carbonate |
| 33.3 g | potassium bromide |
| 47.3 g | potassium chloride |
| 8.8 g | silver nitrate |
| 0.3 g | copper oxide |

The mixture components are weighed and mixed. The mixture is placed into a 1 liter-platinum crucible and is molten at 1365° C. Subsequently, the liquid glass is refined at 1410° C., then is cooled to 1345° C. and homogenized by stirring for 18 minutes. The liquid mixture is then rolled to form a glass bar 4 mm thick and 70 mm wide.

Heat treatment takes place at 630° C. for 1 hour in an air circulation furnace, followed by cooling to ambient temperature at a rate of 40°/min.

This glass was measured to have a refractive index $n_d$ of 1.605, a dispersion $V_d$ of 50.0 and a density D of 2.79 g/cm$^3$.

Measurement of the phototropic characteristics taken at 20° C. on a 2 mm thick glass showed a saturation transmission of 29 percent, a regeneration half-life of 3.6 minutes and a transmission after 30 minutes regeneration of 78 percent.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

Industrial Applicability

As can be seen from the present specification and examples, the present invention is industrially useful in providing lightweight phototropic glass compositions suitable for use in eyeglasses.

What is claimed is:

1. A phototropic glass which contains a carrier of phototropy precipitations containing silver and halogens characterized in that it has a refractive index of $\geq 1.59$, an Abbe index of $\geq 40$ and a density of $\leq 3.2$ g/cm$^3$, consisting essentially of, in weight percent:

(a)
  SiO$_2$: 32–47
  B$_2$O$_3$: 14.5–27
  P$_2$O$_5$: 0–11
  wherein SiO$_2$, +B$_2$O$_3$+P$_2$O$_5$ is 58.0–71.0 percent;
(b)
  Al$_2$O$_3$: 0–0.4
  ZrO$_2$: 1.5–10
  La$_2$O$_3$: 0–23
  Nb$_2$O$_5$: 0–2
  Ta$_2$O$_5$: 0–18
  WO$_3$: 0–1
  wherein Al$_2$O$_3$+ZrO$_2$+La$_2$O$_3$+Nb$_2$O$_5$+Ta$_2$O$_5$+WO$_3$ is 2.0–25.0 percent;
(c)
  MgO: 0–1
  CaO: 0–6
  SrO: 0–24
  wherein the total of alkaline earth metal oxides is 2.0–24.0 percent;
(d)
  PbO: 0.5–12
  TiO$_2$: 0.5–8
  wherein La$_2$O$_3$+SrO+PbO+TiO$_2$+Nb$_2$O$_5$+ZrO$_2$+WO$_3$+Ta$_2$O$_5$ is 12–34 percent;
(e)
  Li$_2$O: 0.5–6
  Na$_2$O: 0–4
  K$_2$O: 6–12
  wherein the total of alkali metal oxides is 6.5–15 percent; and
(f) Ag$_2$O at least 0.05, copper oxide or another phototropic sensitizer between 0 and 0.1, and halogens at least 0.25 percent.

2. A phototropic glass according to claim 1, characterized in that at least one component of the SiO$_2$, B$_2$O$_3$ and P$_2$O$_5$ group is replaced at least in part by GeO$_2$.

3. A phototropic glass according to claim 1, wherein La$_2$O$_3$ is replaced, in whole or in part, by at least one other rare earth oxide.

4. A phototropic glass according to claim 1, which has been endowed with suitable precious metals for the purpose of tinting it brown in an exposed condition.

5. A phototropic glass according to claim 1, further comprising, as a carrier of phototropy:
  at least 0.1 percent Ag$_2$O, at least 0.1 percent bromine, at least 0.1 percent chlorine, and at least 0.004 percent copper oxide.

6. A phototropic glass according to claim 1, further comprising up to 1 percent of at least one tinting oxide.

7. A phototropic glass having a refractive index of 1.613, an Abbe number of 47, a density of 2.96 g/cm$^3$, and consisting essentially of the following composition, in percent by weight:

| | |
| --- | --- |
| SiO$_2$ | 39.10 |
| B$_2$O$_3$ | 18.00 |
| P$_2$O$_5$ | 0.25 |
| Al$_2$O$_3$ | 0.10 |
| ZrO$_2$ | 5.50 |
| La$_2$O$_3$ | 10.50 |
| Nb$_2$O$_5$ | 0.50 |
| WO$_3$ | 1.00 |
| CaO | 0.10 |
| SrO | 1.00 |
| PbO | 5.55 |
| TiO$_2$ | 5.70 |
| Li$_2$O | 2.20 |
| Na$_2$O | 2.20 |
| K$_2$O | 9.00 |
| Ag$_2$O | 0.20 |

-continued

| | |
|---|---|
| CuO | 0.016 |
| Cl | 0.25 |
| Br | 0.36. |

8. A photographic glass having a refractive index of 1.620, an Abbe number of 51, a density of 2.93 g/cm$^3$, and consisting essentially of the following composition, in percent by weight:

| | |
|---|---|
| SiO$_2$ | 39.10 |
| B$_2$O$_3$ | 18.00 |
| P$_2$O$_5$ | 0.25 |

-continued

| | |
|---|---|
| Al$_2$O$_3$ | 0.10 |
| ZrO$_2$ | 5.50 |
| La$_2$O$_3$ | 0.50 |
| WO$_3$ | 1.00 |
| CaO | 0.10 |
| SrO | 1.00 |
| PbO | 15.55 |
| TiO$_2$ | 5.70 |
| Li$_2$O | 2.20 |
| Na$_2$O | 2.20 |
| K$_2$O | 9.00 |
| Ag$_2$O | 0.27 |
| CuO | 0.009 |
| Cl | 0.64 |
| Br | 1.21. |

* * * * *